United States Patent [19]
Griffin

[11] Patent Number: 5,512,078
[45] Date of Patent: Apr. 30, 1996

[54] APPARATUS FOR MAKING LINEARLY TAPERED BORES IN QUARTZ TUBING WITH A CONTROLLED LASER

[76] Inventor: Stephen E. Griffin, 2108 E. Solano Dr., Phoenix, Ariz. 85016

[21] Appl. No.: 217,696

[22] Filed: Mar. 24, 1994

[51] Int. Cl.⁶ .................................................. C03B 15/14
[52] U.S. Cl. ...................... 65/484; 65/485; 65/272; 65/269; 65/109; 65/262; 219/121.62; 219/121.61
[58] Field of Search ............................ 65/272, 269, 271, 65/108, 109, 393, 162, 392, 407, 484, 533, 439, 537, 485; 219/121.62, 121.61

[56] References Cited

U.S. PATENT DOCUMENTS

| | | | |
|---|---|---|---|
| 3,263,852 | 8/1966 | Fridrich | 65/33.5 |
| 3,362,435 | 1/1968 | Meyer | 65/109 |
| 3,435,213 | 3/1969 | Colbow | 219/121.61 |
| 3,897,233 | 7/1975 | Szilagyi | 65/109 |
| 3,985,535 | 10/1976 | Bennett | 65/109 |
| 4,078,910 | 3/1978 | Dalgoutte | 65/407 |
| 4,499,362 | 2/1985 | Martin | 219/121.61 |
| 4,582,523 | 4/1986 | Marcucci | 65/109 |
| 4,601,740 | 7/1986 | Lynch | 65/109 |
| 4,701,591 | 10/1987 | Masaki | 219/121.61 |
| 4,921,522 | 5/1990 | Flaming | 65/271 |
| 5,041,714 | 8/1991 | Funk | 219/121.62 |
| 5,043,555 | 8/1991 | Iehisa | 219/121.61 |
| 5,098,427 | 3/1992 | Hessel | 219/121.62 |
| 5,152,816 | 10/1992 | Berkey | 65/109 |
| 5,181,948 | 1/1993 | Belgum | 65/271 |

Primary Examiner—John M. Hoffmann
Attorney, Agent, or Firm—H. Gordon Shields

[57] ABSTRACT

Method and apparatus for providing a linearly tapered bore in quartz/glass tubing includes a laser and elements for focusing the laser onto the glass tubing. The glass/quartz tubing is rotated in the laser beam and is moved vertically in the laser beam to provide a linear taper in the interior bore. The power of the laser beam is controlled and the laser beam is appropriately focused by a lens to provide a desired width of the beam at the glass/quartz tubing.

7 Claims, 4 Drawing Sheets

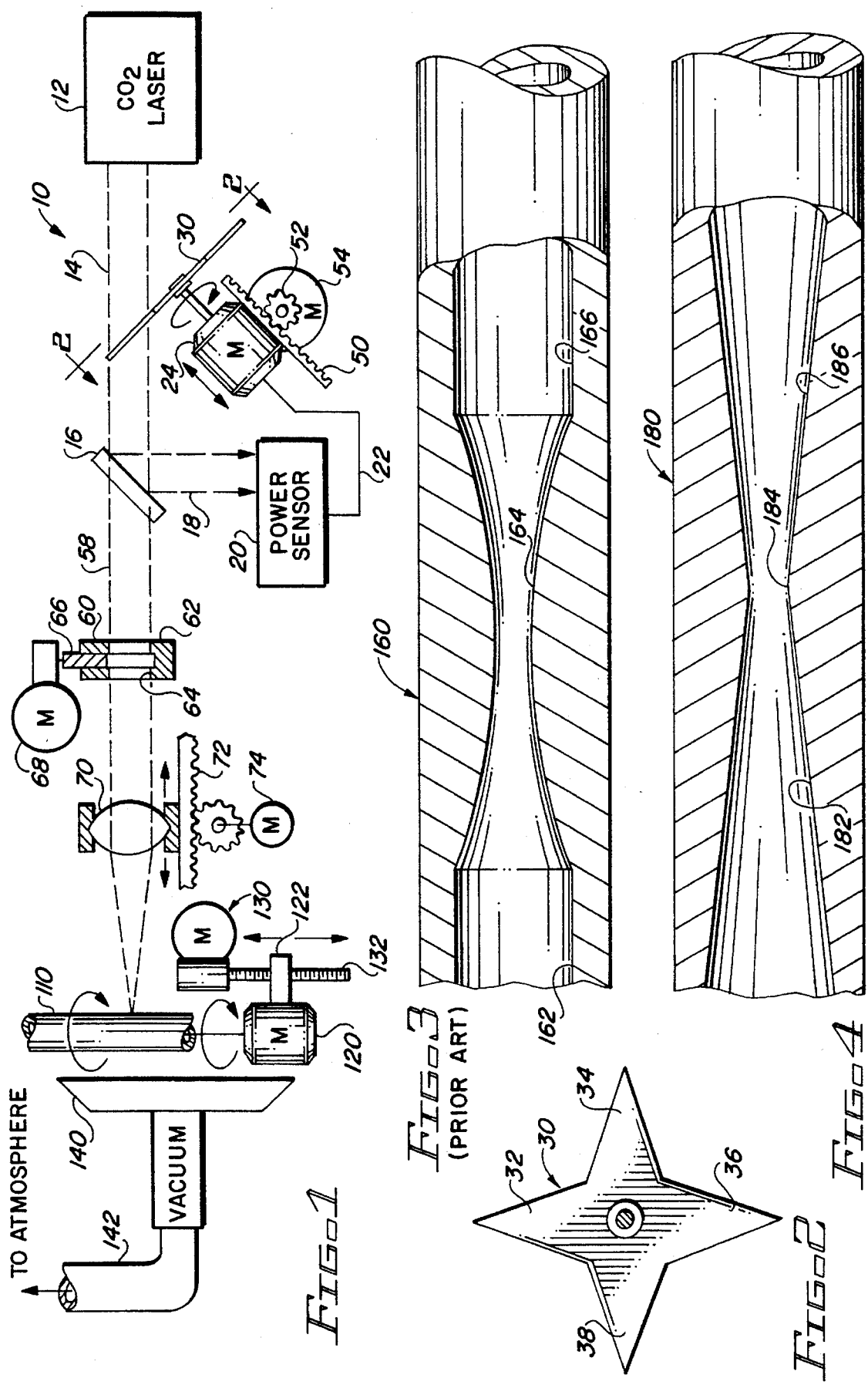

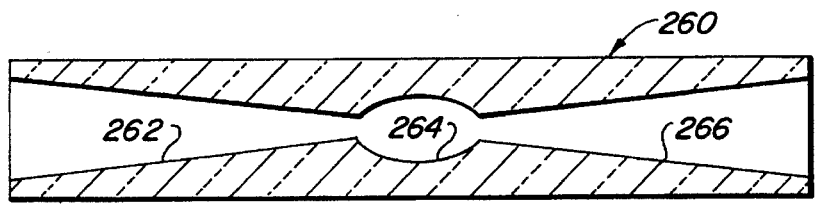
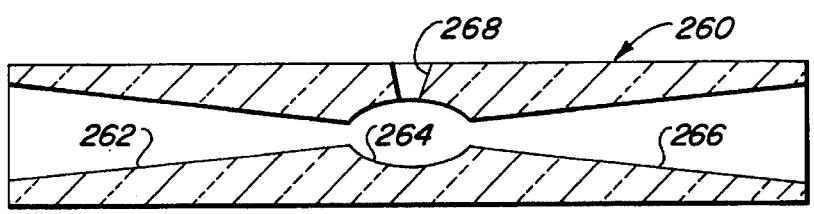
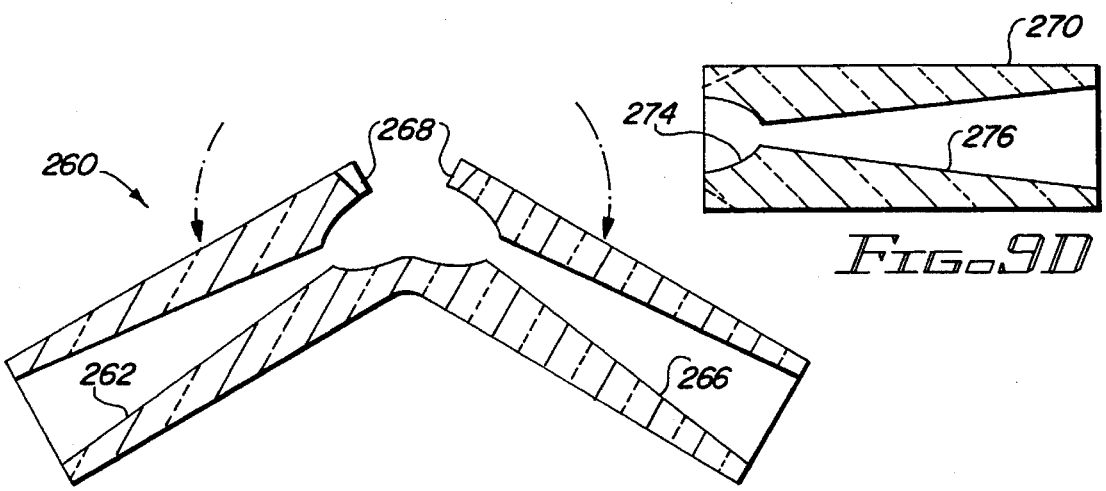
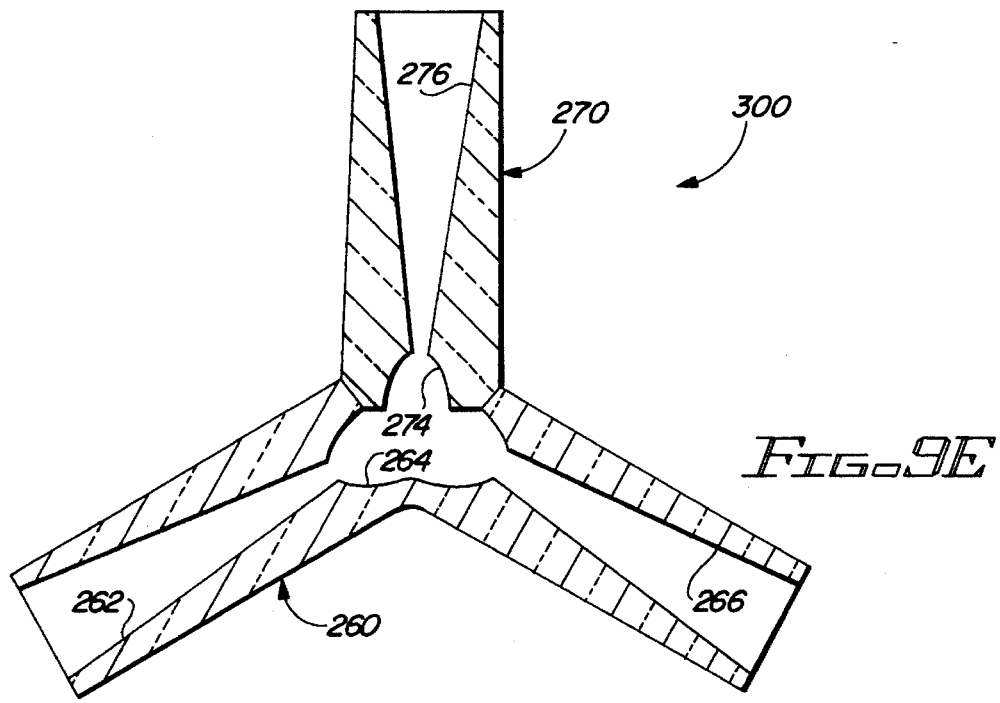

5,512,078

APPARATUS FOR MAKING LINEARLY TAPERED BORES IN QUARTZ TUBING WITH A CONTROLLED LASER

BACKGROUND OF THE INVENTION

1. Field of the Invention

This invention relates to quartz tubing and, more particularly, to quartz tubing used in coupling glass and silica capillary elements together.

2. Description of the Prior Art

U.S. Pat. No. 4,185,883 (Chown et al) discloses an optical fiber coupling element which includes a glass sleeve secured to a length of optical fiber. The optical fiber is placed in the glass sleeve, and the sleeve is heated so that it collapses around the fiber to hold the fiber in place.

U.S. Pat. No. 4,869,745 (Flaming) discloses a micropipette puller which includes a mirror that is oscillated to move energy of a laser along a selected portion of a glass tubing. The mirror varies the amount of heat transmitted to the glass tubing as the tubing is being pulled.

U.S. Pat. No. 4,921,522 (Flaming) discloses a variation of the '745 Patent. The '522 Patent is a Continuation-in-Part of the '745 Patent. A concave mirror is used in the '522 Patent to direct the energy from a laser against glass tubing being pulled.

It will be noted that none of the above described patents refers to providing a linear taper in the glass or quartz tubing elements involved in the patents.

SUMMARY OF THE INVENTION

The invention claimed and described herein comprises method and apparatus for providing a linear taper in quartz or glass tubing for connecting capillary and fiberoptic elements together. Energy from a laser is modulated by a chopper which comprises rotating blades moved into and out of the laser beam. The modulated energy from the laser is directed against a rotating glass/quartz tube through a focusing lens. The glass/quartz tube is rotated and is moved linearly in the laser beam. The more intense the beam, or the longer the beam impinges on a particular location of the glass tubing, the more the tubing collapses. Movement of the tubing both rotationally and linearly results in a linearly tapered interior bore of the quartz/glass tubing.

Among the objects of the present invention are the following:

To provide new and useful method for obtaining a linear taper in quartz tubing;

To provide apparatus for linearly tapering the interior bore of quartz tubing;

To provide new and useful apparatus for tapering glass tubing;

To provide new and useful apparatus for joining capillary elements of similar and dissimilar diameters; and To provide a ferrule having a linear taper useful in terminating fiberoptic taper elements. dr

BRIEF DESCRIPTION OF THE DRAWING

FIG. 1 is a stomatic diagram of the apparatus of the present invention.

FIG. 2 is the view in partial section taken generally along line 2—2 of FIG. 1.

FIG. 3 is a side view in partial section of quartz tubing representative of the prior art.

FIG. 4 is a side view in partial section of quartz tubing made with the apparatus and by the method of the present invention.

FIGS. 9A, 9B, 9C, 9D, and 9E are sequential views in partial section illustrating the making of a splitter of the present invention.

DESCRIPTION OF THE PREFERRED EMBODIMENT

Figure 5:
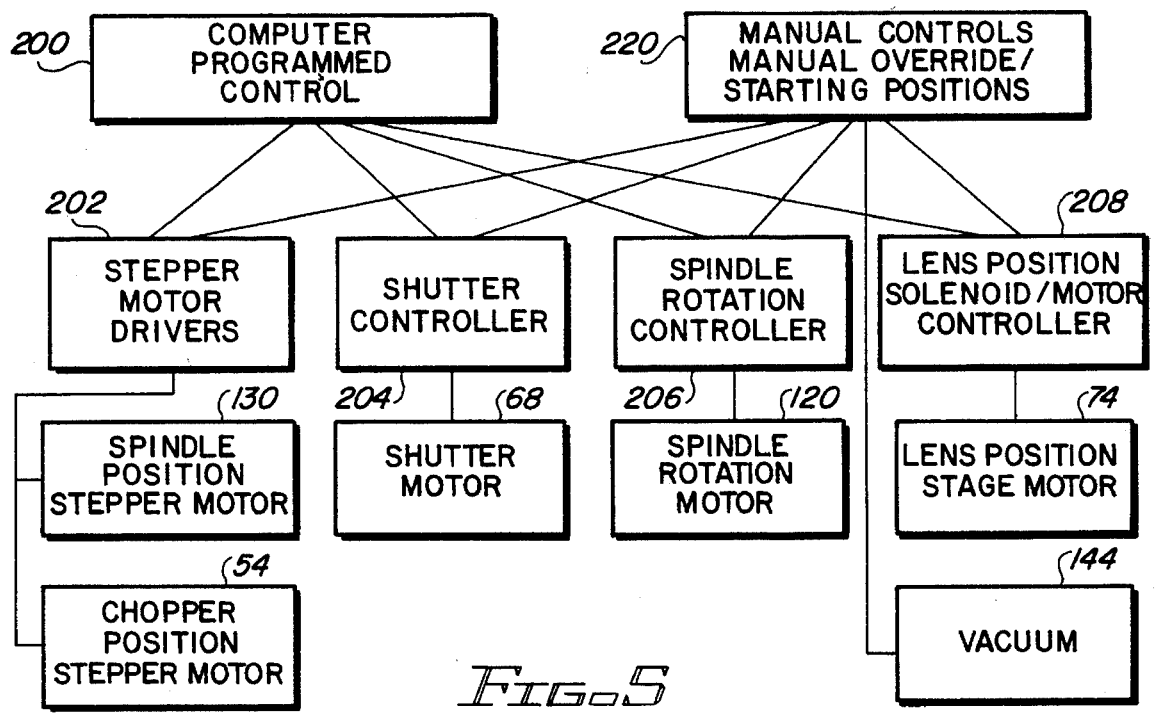
FIG. 5 is a block diagram illustrating the control systems of the present invention.

FIG. 1 is a side view in partial section schematically illustrating apparatus 10 of the present invention used to make coupling elements for fiberoptics, etc. A coupling element ferrule 160 of the prior art is illustrated in FIG. 3. FIG. 3 comprises a view in partial section through the coupling portion of the quartz tubing ferrule 160.

FIG. 4 is a side view in partial section of a ferrule or coupling element 180 made by the apparatus 10 of FIG. 1. The cross sectional configurations of the ferrule or coupling elements 160 and 180 is clearly set forth.

In FIG. 3, the coupling element 160 includes a bore 162 and a bore 166 spaced apart from each other and separated by a coupling bore 164. The bores 162 and 166 have a relatively constant diameter, while the bore 164 has a varying diameter. The diameter of the bore 164 is curved, rather than linear.

For the coupling element or ferrule 180 of FIG. 4, there are two linearly tapered bore portions 182 and 186 which taper inwardly towards a minimum diameter portion or throat 184. The bores 182 and 186 are substantially identical in their taper, which taper is a uniform taper.

The apparatus 10 of FIG. 1 is used to make the uniform tapers 182 and 186 of the ferrule 180. The apparatus 10 of FIG. 1 includes a carbon dioxide laser 12 which provides an output light beam 14. The power of the output light beam 14 is directed toward a beam splitter 16. The beam splitter 16 reflects a portion 18 of the beam 14 to a power sensor 20.

The power sensor 20 senses the power output of the laser 12 and modulates the power as appropriate through a pair of motors. The motors include a motor 24 which is coupled to a chopper 30. The chopper 30 comprises a configured disk having a plurality of blades, and the blades rotate in the path of the beam 14. The motor 24 rotates the chopper 30.

The motor 24 is mounted on a rack 50 which is coupled to a pinion gear 52. The pinion gear 52 is in turn coupled to the output shaft of a reversible motor 54. Rotation of the gear 52 by the motor 54 moves the chopper motor 24 towards and away from the beam 14.

FIG. 2 comprises a front or plan view of the chopper 30. FIG. 2 is taken generally along line 2—2 of FIG. 1.

The chopper 30, as indicated above, comprises a disk having a plurality of blades. The chopper 30 is illustrated as having four blades, including blades 32, 34, 36, and 38. The configuration of the blades 32, 34, 36, and 38 provides a varying amount of surface area which reflects energy from the light beam 14 to a beam dump (not shown). The tips of the blades are the thinnest portion, and the thickness of the blades increases as the blades 32 . . . 38 go inwardly towards the shaft to which they are secured.

Stated in the opposite manner, the thickness of the blades 32 . . . 38 tapers outwardly from a maximum to a minimum at the outer distal point or tips of the blades. The geometry or blade configuration may vary, as desired. The geometry of the blades varies the amount of energy from the beam 14 which is used, ultimately, in the manufacture of elements, such as the ferrule 180 of FIG. 4, as the chopper 30 is moved into and out of the beam 14.

It will accordingly be understood that the closer to the beam 14 that the chopper center is, the greater the amount of that energy will be reflected by the chopper and the lesser the amount of energy that will be directed to the splitter 16 and onwardly from there, as will be discussed below.

For maximum energy transmitted onwardly, the chopper 30 will be moved away from the beam 14 and will thus have a minimum surface area directed into the beam 14.

By varying the location of the chopper 30 relative to the output beam 14 of the laser 2, the output of the beam 14 may be modulated or controlled as desired.

While a portion 18 of the beam 14 is directed by the splitter 16 towards the power sensor 20, the remaining portion of the beam, indicated by reference number 58, is directed through the splitter 16 and through a shutter 60 to a lens 70. The shutter 60 includes a housing 62 through which extends an aperture 64. The aperture 64 is controlled by a shutter element 66. The shutter element 66 is moved by a motor 68 or a solenoid to either allow the passage of the light beam 58 through the shutter 60 or block the aperture 64 and thus prevent the transmission of the light beam 58 to the lens 70.

The lens 70 is a focusing lens which may be moved to adjust the width of the beam 58 relative to a length of quartz tubing 110. The lens 70 is secured to a rack 72 which is moved through a pinion gear connected to a motor 74. The rotation of the shaft of the motor 74 moves the lens 70 towards or away from the quartz tubing 110 to focus the beam 58 on the quartz tubing, as desired.

As illustrated in FIG. 1, the beam 58 is focused at a point on the tubing 110 to provide maximum intensity of the beam 58 at the location of the focus point on the tubing 110.

Movement of the lens 70 changes the focus of the beam 58, and accordingly changes the concentration of the power of the beam relative to the quartz tubing 110.

The quartz tubing 110 is rotated by a motor 120 to which the tubing 110 is appropriately secured. The tubing 110 is also moved vertically relative to the beam 58 by means of a motor 130. The motor 130 drives a screw 132 to which a nut 122 is secured. The nut 122 is in turn secured to the motor 120 so that rotation of the screw 130 moves the nut 122, the motor 120, and the tubing 110 vertically relative to the beam 58.

The quartz tubing is, of course, a form of silica, and the heating thereof produces silica dust. The silica dust is removed from the tubing 110 by means of a vacuum head 140 which is connected to a vacuum conduit 142. A vacuum pump motor 144, illustrated in FIG. 5, in turn produces the vacuum necessary for the removal of the silica dust or particulates to an appropriate trap through the conduit 142.

Control of the apparatus 10 is illustrated in FIG. 5, which comprises a block diagram of the various control elements involved. There are two control systems involved, a computer control system 200 and a manual control system 220. The manual control system 220 comprise override controls which move the various elements to their starting positions, as desired.

There are stepper motor drivers 202 which are connected to the motors 54 and 130. The motors 54 and 130 are stepper motors which move incrementally, as desired. The motor 54 moves the chopper 30 and its motor 24 towards and away from the beam 14. It will be noted that the chopper 30 is disposed at about a 45 degree angle to the light beam 14.

The motor 130 is a stepper motor which moves the quartz tubing and its rotational motor 120 vertically relative to the beam 58.

To begin the operations, the shutter 66 must be withdrawn from the aperture 64. The movement of the shutter 66 is controlled by a shutter controller 204.

The control of the spindle rotation motor 120, which rotates the quartz tubing 110, is controlled by a spindle rotation controller 206. Variations in rotational speed are a function of translational speed of the spindle, as will be discussed below in conjunction with FIGS. 8A and 8B.

Finally, there is a lens position motor controller 208 which controls the motor 74 to move the lens 70 relative to the light beam 58 and to the quartz tubing 110.

Each of the controllers may be manually adjusted by the plurality of manual controls 220. This allows the various controllers to be moved to the starting positions, as required. There is also a manual control for actuating the vacuum pump motor 144.

Figure 6A:
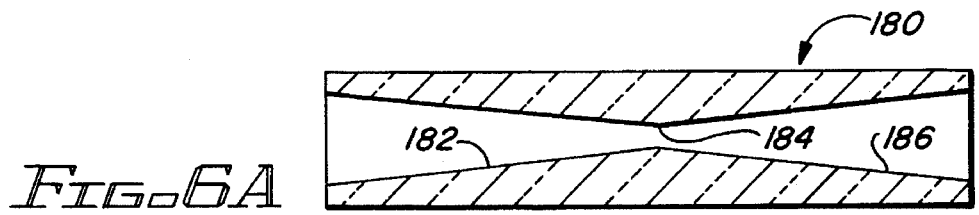
FIG. 6A is a side view in partial section through a ferrule of the present invention.
Figure 6B:
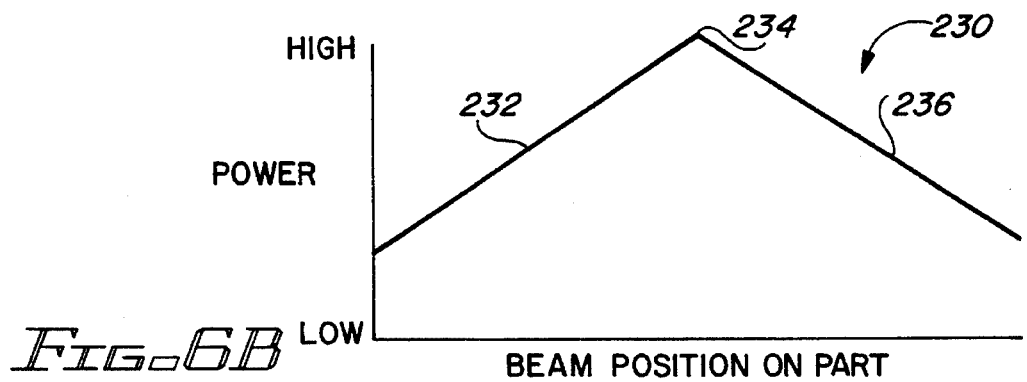
FIG. 6B is a schematic representation illustrating the employment of the present apparatus in relation to the power involved in making the ferrule of FIG. 6A

FIG. 6A is a view in partial section through ferrule 180. FIG. 6B is a power curve showing the correlation between the power of the laser 12 and the tapered bores involved in the manufacture of the ferrule 80. FIGS. 61 and 6B are correlated to each other, so for the following discussion, reference will be made to both FIGS. 6A and 6B.

The ferrule 180 is shown in partial section, with its three bore portions 182, 184, and 186 correlated to a power curve 230. The power curve 230 comprises an example of the power output of the laser 12 on the vertical scale, with low power at the bottom of the scale and high power at the top of the scale. The power indication comprises the Y axis of the curve 230. The X axis refers to the beam position on the ferrule 180. It will be understood that the beam remains fixed in place, and that the ferrule itself moves vertically, as indicated above. For purposes of illustration however, the ferrule apparatus 180 is shown in cross section and parallel to the X axis.

The wide end of the bore 182 starts with low power, and as the power increases, the diameter of the bore decreases. Thus, the bore 182 tapers from a maximum diameter to the center portion 184, which is minimum diameter. The center portion 184 comprises a maximum power output of the carbon dioxide laser 12 focused on the ferrule 180.

The power curve 230 increases uniformly upwardly as shown by a sloping curve portion 232 to a maximum point 234 which is correlated to the minimum diameter portion 184 of the ferrule 180. The power curve then tapers uniformly downwardly in a sloping portion 236 until the diameter of the bore 186 is maximum. The curve 230 is symmetrical, and accordingly the bores 182 and 186 are symmetrical and are virtually the mirror image of each other. The modulation of the power of the laser 12 is accomplished by movement of the chopper 30 into and out of the output beam 14 of the laser 12, as discussed above.

Figure 7A:
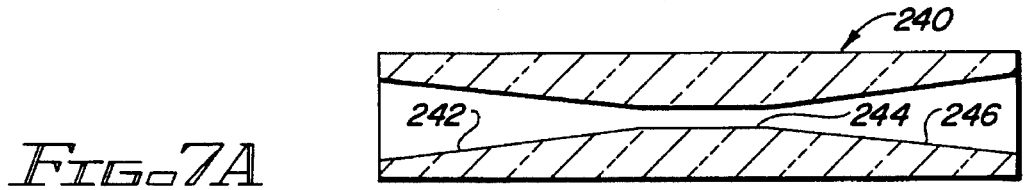
FIG. 7A is a side view in partial section of a coupler element of the present invention.
Figure 7B:
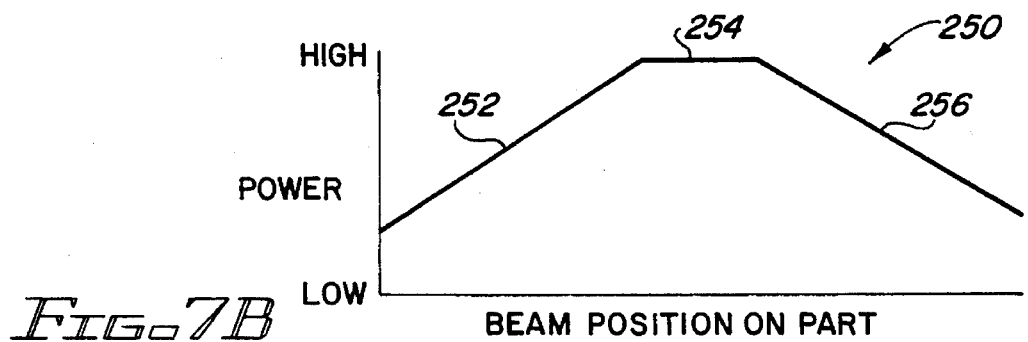
FIG. 7B is a schematic diagram illustrating the use of the present apparatus and present method in making the fiberoptic element coupler element of FIG. 7A and the power involved therein.

FIG. 7A is a view in partial section through a coupler element 240. FIG. 7B comprises a power output curve 250, similar to the power output curve 230 of FIG. 6B, but for a different element. The element comprises the fiberoptic element coupler 240. The fiberoptic element coupler 240 is shown in cross section in FIG. 7A. The longitudinal axis of the coupler 240 is parallel to the X axis of the power curve disposed beneath the element 240. As in FIG. 6, the Y axis of the curve 250 illustrates the power output of the laser 12, while the X axis represents the beam position on the coupler element 240. FIGS. 7A and 7B are correlated, and reference will be made to both of them for the following discussion.

The coupler element 240 includes a bore 242 which tapers from a maximum to a minimum from left to right. The bore 242 extends to a central uniform bore portion 244. From the central, uniform bore 244, a bore 246 tapers outwardly to a maximum. The bores 242 and 246 are substantially mirror images of each other.

The power curve 250 indicates the uniform increase of power from left to right in an upwardly sloping portion 252 to the termination of the bore 242 at minimum diameter. The bore 244 is of the uniform diameter, indicated by the constant use of the relatively high power of the curve 250 at a flat top portion 254 of the curve.

At the end of the bore portion 244, remote from the bore portion 242, the power of the laser 12 is reduced at a uniform rate, which is the same rate as the increase in the power output to form the bore 242. This decrease in power is indicated by a downwardly sloping portion 256 of the curve 250. Accordingly, the bore 246 has a uniformly outwardly or increasing diameter as the power is decreased to the minimum power, which minimum power is the same as the beginning power. Accordingly, the bores 242 and 246 are substantially mirror images of each other, with the length of the central uniform diameter bore portion 254 correlated to the time of the maximum beam strength portion 254 and the vertical speed at which the representative tubing 110 is moved in the beam 58. See FIG. 1.

Figure 8A:
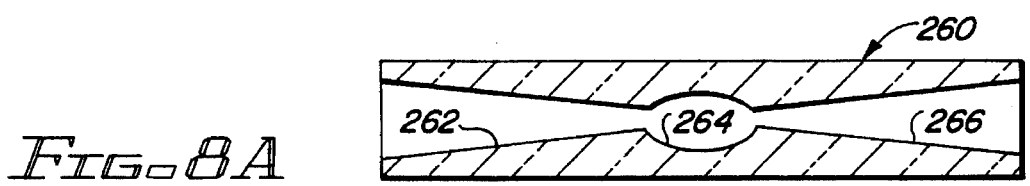
FIG. 8A is a side view in partial section of a splitter precursor of the present invention.

FIG. 8A is a view in partial section through a splitter precursor 260.

Figure 8B:
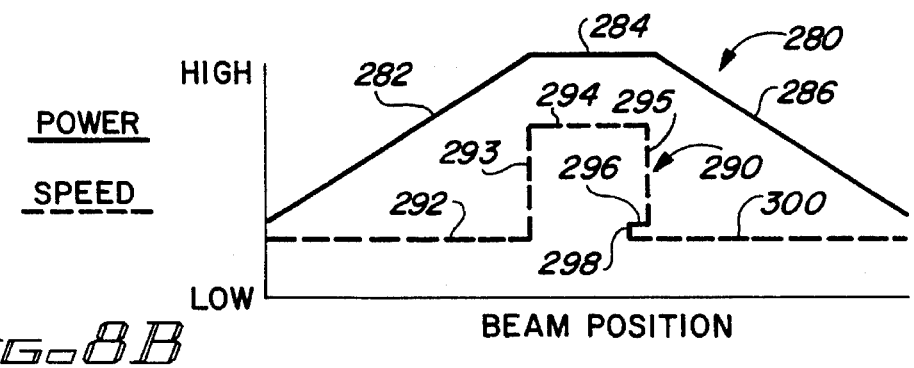
FIG. 8B is a schematic representation illustrating the employment of the present apparatus and method in making the splitter precursor of FIG. 8A with regard to both power and rotational speed.

FIG. 8B comprises a pair of curves 280 and 290 utilized in the manufacture of the splitter precursor 260 of FIG. 8A. FIGS. 8A and 8B are correlated, and accordingly reference will be made to both of them for the following discussion. The splitter precursor 260 is shown in partial section generally parallel to the Y axis of the pair of curves which comprise the beam position. The curves include a power curve 280 and a speed curve 290. The Y axis comprises the power scale from low and to bottom to high at the top for the curve 280. The Y axis comprises a speed indication from low at the bottom of the scale to high at the top of the scale for the curve 290.

The splitter precursor 260 includes three bore portions, a tapered bore portion 262, a curved central bore portion 264, and a second tapered bore portion 266. The bore portions 262 and 266 are mirror images of each other, while the bore portion 264, between the bores 262 and 266, comprises a generally oval shaped bore portion in which the diameter increases from a minimum to a maximum and then decreases from the maximum to the minimum. The bore portion 264 is a curved bore, as opposed to the linear taper of the bores 262 and 266.

As indicated by the curve 280, the formation of the splitter precursor 260 is substantially identical with respect to power as the fiberoptic element coupler 240 of FIG. 7. It will be noted that the power curve 280 is substantially the same as the power curve 250.

The central bore 264, rather than having a uniform cross section, as does the bore portion 244 of the coupler 240, has a curved configuration, as indicated above. The oval curvature of the bore 264 is accomplished by increased translational speed of the element 260 in the beam 58.

The translational speed of the element 260 is held constant while the power is increased to form the bore portion 262. The power increase is indicated by an upwardly sloping curve portion 282. When the minimum diameter of the bore portion 262 has been received, the power is held steady for a period of time, as indicated by a top flat portion 284 of the curve 280. The translational speed of the element 260 is held steady during the formation of the bore 262, as indicated by a flat portion 292 of the curve 290. At a point in time corresponding to the beginning of the bore portion 264, when the power is held steady at maximum power, as indicated by the portion 284 of the curve 280, the translation speed is increased to a maximum. The sudden increase is indicated by a portion 293 of the curve 290.

The translation speed is then held steady, as indicated by the portion 294 of the curve 290. The curve portion 294 compares with or correlates to the portion 284 of the curve 280 and to the condition of the central bore portion 264.

At the end of the bore 264, and at the beginning of the downward slope 286 of the curve 280, the translation speed decreases rapidly, as indicated by a curve portion 295. The translation speed drops to a minimum and the motor 130 stops and reverses itself, as indicated by a portion 296 of the curve 290 to help form the curved bore portion 264.

The motor 130 then stops again and reverses, as indicated by a portion 298 of the curve 290. The motor 130 then holds its speed constant at its lowest, corresponding to a curve portion 300, while the power decreases, as indicated by the decreasing slope of a portion 286 of the curve 290.

At the end of the bore portion 264, the translational speed is decreased suddenly and reversed twice before returning to the speed employed to produce 262 for producing 266. The double reversal of translation serves to reheat the quartz before proceeding to formation of bore 266 providing similar conditions as were present when forming bore 262.

The fabrication of a splitter is illustrated in FIGS. 9A, 9B, 9C, and 9D.

In FIG. 9A, the splitter precursor 260 is shown in cross section. In FIG. 9B, the precursor element 260 is shown with a hole 268 extending radially through the precursor at the curved bore 264. In FIG. 9C, the precursor element 260 is shown bent to receive a precursor half. The precursor half comprises the third leg of a complete splitter.

FIG. 9D comprises a view in partial section of a half precursor 270. The half precursor or precursor half 270 includes a half of a center curved bore 274 and a tapered bore 276. The bore 274 comprises essentially half of the bore 264, and the bore 276 corresponds to the bore 266. The half element 270 is one half of a precursor element 260. Accordingly, three precursor elements are used to make two splitter elements.

A splitter 300 is shown in FIG. 9E in partial section. The splitter 300 comprises the splitter 260 of FIG. 9B bent to form an inverted "V", as shown in FIG. 9C, with the splitter half 270 appropriately secured to the hole or aperture 268, as widened by the bending of the splitter 260. The splitter half 270 is then appropriately fused to the bent precursor splitter 260 to form the splitter 300.

Figure 10:
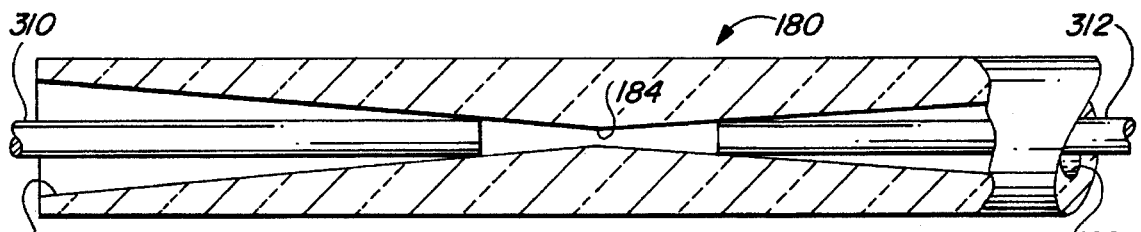
FIGS. 10, 11, and 12 are side views in partial section illustrating the use of elements made by the present method and apparatus in their use environments.

FIG. 10 is a view in partial section of a ferrule 180 used as a coupling element, coupling together two capillary elements of similar diameters. The capillary elements include a capillary element 310 and a capillary element 312. The capillary element 310 is disposed in the bore 182, and the capillary element 312 is disposed in the bore 186. It will be noted that the ends of the capillary elements 310 and 312 are spaced apart an equal distance from the center 184 due to the symmetrical nature of the two bores 182 and 186 relative to the center bore portion 184.

Figure 11:
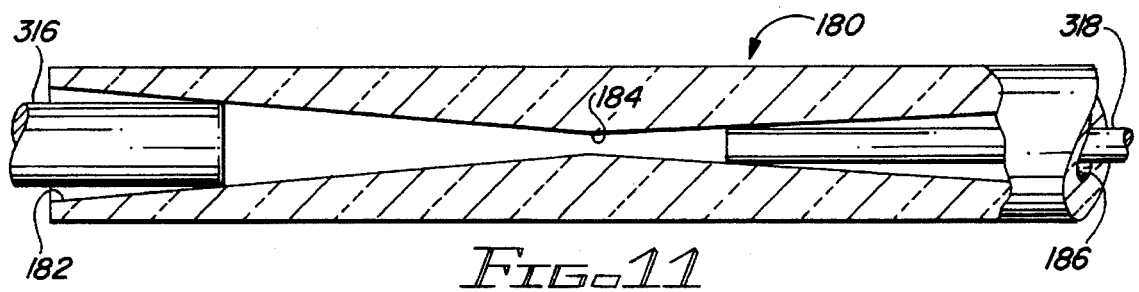

FIG. 11 is a view in partial section through the ferrule 180 illustrating the coupling of capillary elements of dissimilar diameters. A capillary element 316 is shown disposed in the bore 182, and a capillary element 318 is shown disposed in the bore 186.

The diameter of the capillary element 316 is substantially larger than the diameter of the capillary element 318. Accordingly, there is a substantial difference in the distance between the center portion 184, which is the minimum diameter bore portion, and the inner end of the capillary element 316 relative to the inner end of the capillary element 318. The inner end of the capillary element 318 is much closer to the center bore portion 184 than is the inner end of the larger diameter capillary element 316.

Since the bore portions 182 and 186 have substantially identical tapers, there is a common center line or longitudinal axis of the two bores. Accordingly, the capillary elements 316 and 318 are aligned coaxially with respect to each other as well as with respect to the bores 182 and 186. Similarly, the capillary elements 310 and 312 are coaxially aligned with each other since the bores 182 and 186 have substantially identical tapers.

Figure 12:
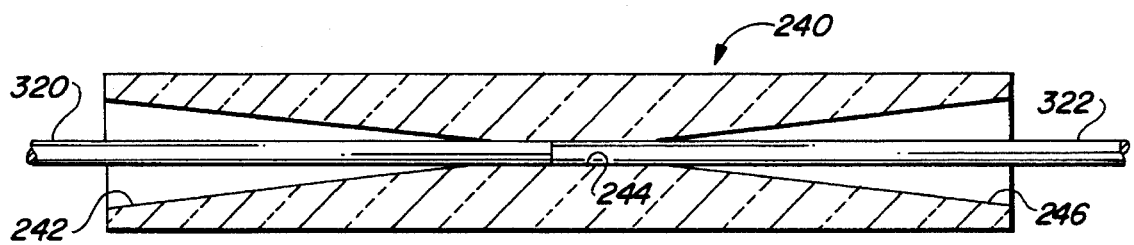

FIG. 12 discloses the use of the fiberoptic coupler element 240 in coupling together a pair of fiberoptic elements 320 and 322.

The fiberoptic element 320 extends through the bore 242 and about half way through the center bore portion 244, which has a constant diameter. The fiberoptic element 322 extends through the bore 246 and into the bore 244 until it is disposed against the inner end of the fiberoptic element 320.

The diameter of the central bore portion 244 is substantially the same as the outer diameter of the fiberoptic elements 320 and 322, and there accordingly is a generally direct contact or coupling between the inner ends of the elements 320 and 322. With the inner or junction ends of the fiberoptic elements 320 and 322 cut substantially perpendicular to the longitudinal axis of the elements, the ends of the elements are in an abutting relationship.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. Apparatus for making linearly tapered bores in tubing comprising in combination:

laser means for providing a light beam for producing a heat output for the tubing;

means for focusing the light beam on the tubing;

means for moving the tubing in the light beam;

means for modulating the heat output of the light beam on the tubing as the tubing is moved in the light beam, including sensing the power output of a portion of the light beam; and chopper means movable into and away from the light beam in response to the sensed power output and predetermined parameters.

2. The apparatus of claim 1 in which the means for focusing the light beam on the tubing includes a lens movable in response to predetermined parameters.

3. The apparatus of claim 1 in which the means for moving the tubing in the light beam includes means for moving the tubing linearly and for rotating the tubing.

4. The apparatus of claim 3 in which the means for moving the tubing further includes a first motor for moving the tubing linearly and a second motor for rotating the tubing.

5. The apparatus of claim 1 in which the means for modulating the heat output of the light beam includes a beam splitter for reflecting a portion of the light beam, a power sensor for receiving the portion of the light beam reflected by the beam splitter and sensing the power of the reflected light beam portion, and chopper means movable into and away from the light beam in response to the sensed power.

6. The apparatus of claim 1 which further includes control means for controlling the focus of the beam on the tubing, and for controlling the heat output of the light beam of the laser.

7. The apparatus of claim 6 which further includes means for moving the tubing in the light beam and the control means further includes means for controlling the movement of the tubing in the light beam.

\* \* \* \* \*